United States Patent
Rey et al.

(10) Patent No.: US 9,055,594 B2
(45) Date of Patent: Jun. 9, 2015

(54) REDUCING TRANSMISSION SIGNAL ARTIFACT SPACING

(71) Applicant: Intel IP Corporation, Santa Clara, CA (US)

(72) Inventors: Claudio Rey, Tempe, AZ (US); David Harnishfeger, Chandler, AZ (US); Daniel B. Schwartz, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 13/912,623

(22) Filed: Jun. 7, 2013

(65) Prior Publication Data

US 2014/0364132 A1 Dec. 11, 2014

(51) Int. Cl.
*H03C 1/52* (2006.01)
*H04L 27/04* (2006.01)
*H04W 72/08* (2009.01)

(52) U.S. Cl.
CPC .................................. *H04W 72/082* (2013.01)

(58) Field of Classification Search
CPC ....... H04L 27/04; H04L 27/361; H04L 27/36; H04L 27/2602; H04L 27/3405; H04L 27/12
USPC ......... 375/300, 303, 305, 295, 296, 272, 273, 375/274, 375, 276; 455/450
See application file for complete search history.

(56) References Cited

U.S. PATENT DOCUMENTS

| | | | | |
|---|---|---|---|---|
| 5,323,125 A | * | 6/1994 | Hiben et al. | 332/100 |
| 5,517,529 A | * | 5/1996 | Stehlik | 375/316 |
| 5,781,528 A | * | 7/1998 | Sato et al. | 370/218 |
| 5,978,420 A | * | 11/1999 | Koslov et al. | 375/295 |
| 6,724,832 B1 | * | 4/2004 | Hershberger | 375/301 |
| 7,061,989 B2 | * | 6/2006 | Bellaouar et al. | 375/295 |
| 2009/0111390 A1 | * | 4/2009 | Sutton et al. | 455/77 |
| 2010/0260289 A1 | * | 10/2010 | Sorrells et al. | 375/300 |
| 2011/0287730 A1 | * | 11/2011 | Miller et al. | 455/266 |
| 2012/0195602 A1 | * | 8/2012 | Nakashima et al. | 398/204 |
| 2012/0263217 A1 | | 10/2012 | Gossmann | 375/224 |
| 2012/0314824 A1 | * | 12/2012 | Fujimura | 375/350 |
| 2013/0004180 A1 | * | 1/2013 | Gupta et al. | 398/115 |

(Continued)

OTHER PUBLICATIONS

A fast-locking agile frequency synthesizer for MIMO dual-mode WiFi/WiMAX applications Jul. 2010, vol. 64, Issue 1, pp. 69-79.

(Continued)

*Primary Examiner* — Qutbuddin Ghulamali
(74) *Attorney, Agent, or Firm* — Baker Botts L.L.P.

(57) ABSTRACT

A method of generating a transmission signal may include mixing a baseband signal assigned for transmission within a narrow frequency range ("assigned narrow frequency range") included in a wireless communication channel to produce a shifted signal. The shifted signal may have a shifted frequency that is based on a shift from the assigned narrow frequency range toward a center frequency of the wireless communication channel by a frequency offset. The method may further include shifting a modulation frequency of a modulating signal toward the assigned narrow frequency range frequency range and away from the center frequency by the frequency offset. Additionally, the method may include mixing the shifted signal with the modulating signal to produce a transmission signal having a transmission frequency within the assigned narrow frequency range.

20 Claims, 6 Drawing Sheets

(56) References Cited

U.S. PATENT DOCUMENTS

2013/0028595 A1* 1/2013 Nakagawa et al. ............ 398/25
2013/0316760 A1* 11/2013 Darabi et al. ............. 455/552.1

OTHER PUBLICATIONS

Japanese Office Action; Appl. No. 2014-111050; 5 pages with English translation, Apr. 14, 2015.

* cited by examiner

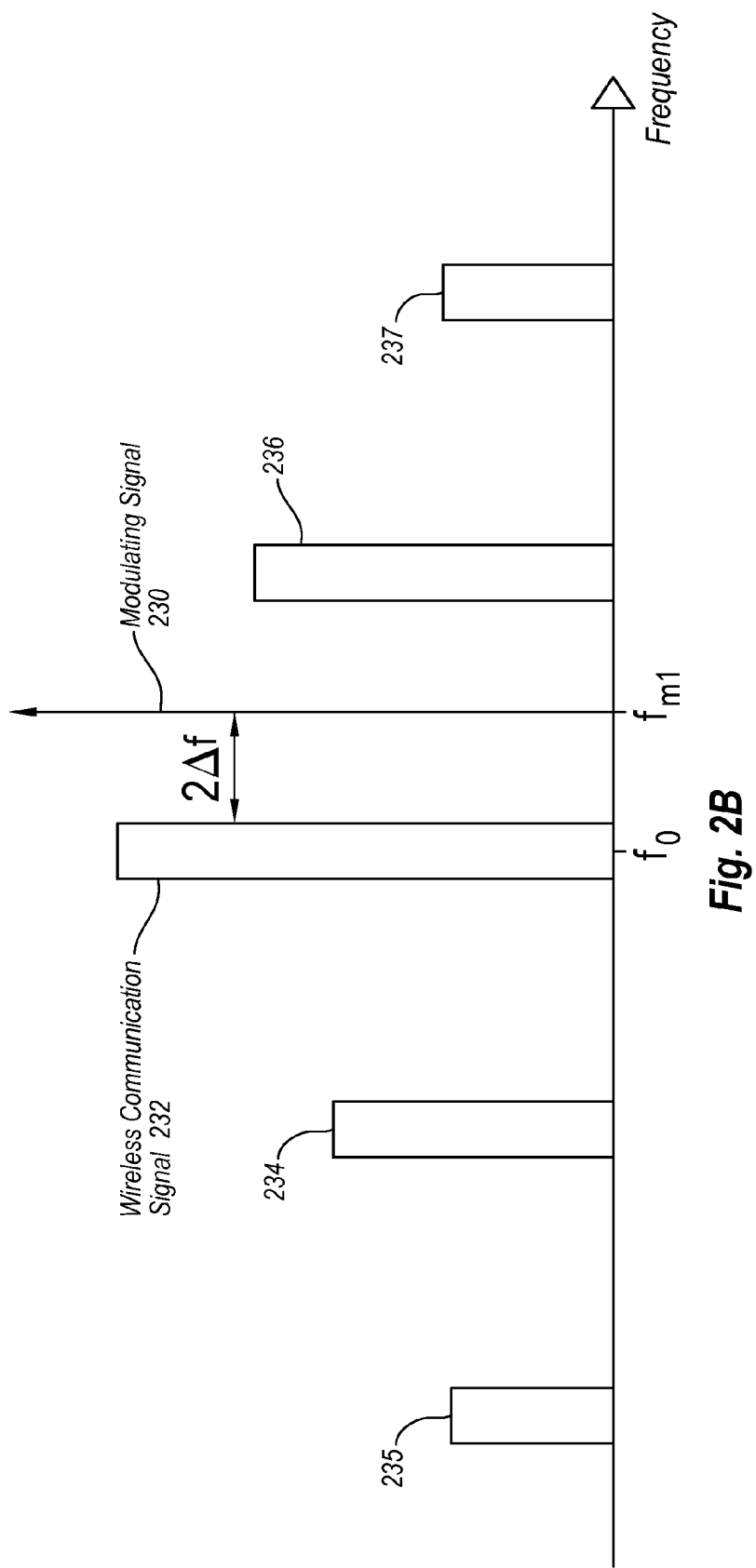

REDUCING TRANSMISSION SIGNAL ARTIFACT SPACING

FIELD

The embodiments discussed herein are related to reducing artifact spacing of a transmission signal that may be transmitted as a wireless communication signal.

BACKGROUND

Wireless communications systems are used in a variety of telecommunications systems, television, radio and other media systems, data communication networks, and other systems to convey information between remote points using wireless transmitters and wireless receivers. In certain instances, a wireless transmitter wireless receiver may be combined into a single device called a wireless transceiver. Because of the many uses of wireless communications systems, portions of a frequency spectrum (commonly referred to as "bands") used for wireless communications may be designated for certain uses to help reduce interference. However, in some instances, a wireless communication signal may be transmitted in a manner such that it may interfere with other wireless communication signals even when transmitted in its designated frequency band.

For example, a wireless communication signal may be transmitted in a designated frequency band, but may have artifacts that may spill outside of the designated frequency band into other frequency bands. These artifacts may accordingly interfere with other wireless communication signals assigned to the other frequency bands.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of generating a transmission signal may include mixing a baseband signal assigned for transmission within a narrow frequency range ("assigned narrow frequency range") included in a wireless communication channel to produce a shifted signal. The shifted signal may have a shifted frequency that is based on a shift from the assigned narrow frequency range toward a center frequency of the wireless communication channel by a frequency offset. The method may further include shifting a modulation frequency of a modulating signal toward the assigned narrow frequency range frequency range and away from the center frequency by the frequency offset. Additionally, the method may include mixing the shifted signal with the modulating signal to produce a transmission signal having a transmission frequency within the assigned narrow frequency range.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2B illustrates an example of a wireless communication signal and some of its associated artifacts;

DESCRIPTION OF EMBODIMENTS

Figure 1:
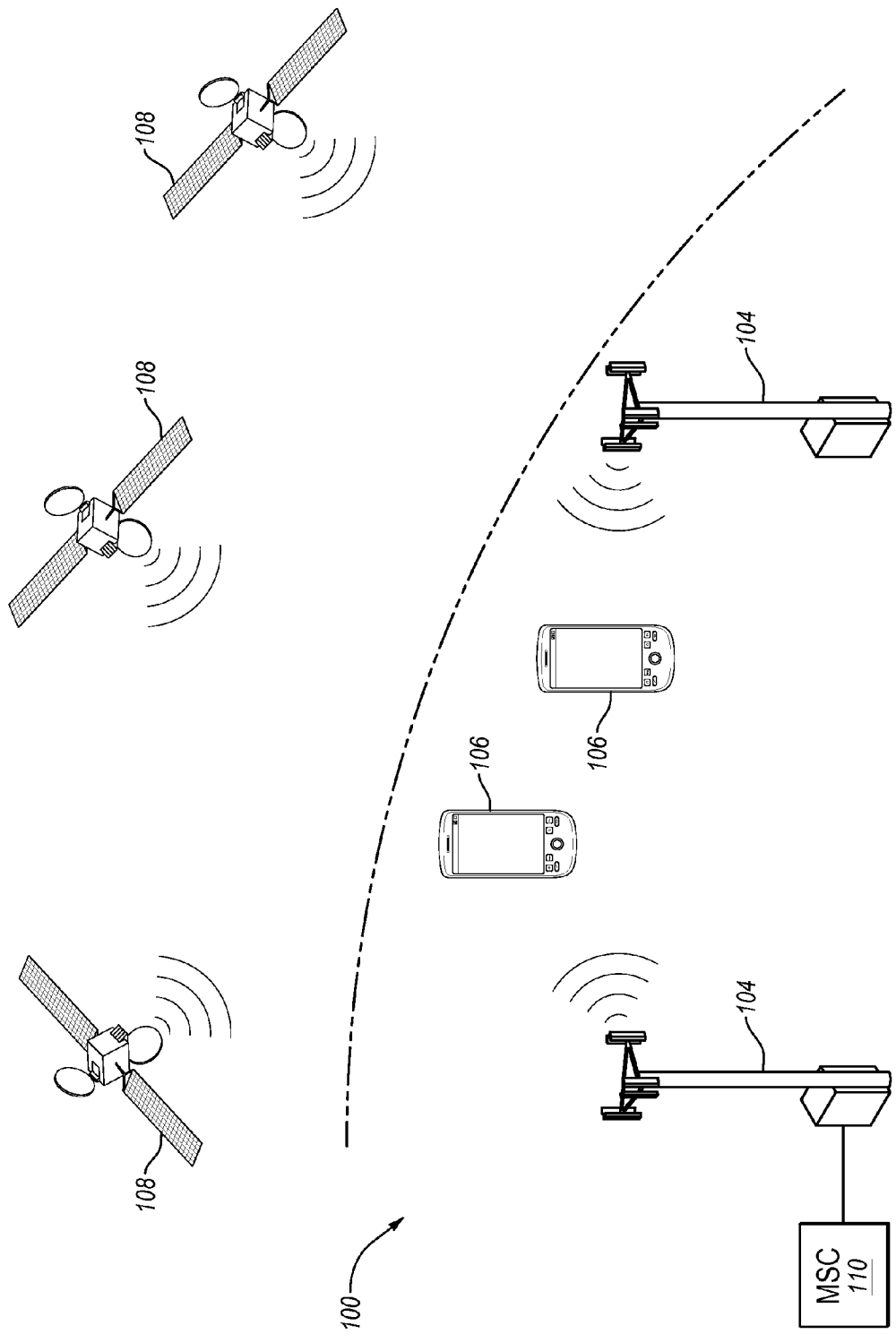
FIG. 1 illustrates an example wireless communication system.

According to some embodiments of the present disclosure, a transmission signal may be generated such that when transmitted as a wireless communication signal, the overall spectral footprint, of the transmission signal and its associated artifacts may be reduced as compared to traditional methods of generating wireless communication signals. The reduced spectral footprint of the transmission signal and its associated artifacts may reduce the amount that the artifacts may spill into other frequency ranges (e.g., wireless communication channels or bands) that may be used by other wireless communication signals. Accordingly, generating the transmission signal in a manner as described in the present disclosure may reduce interference experienced by other wireless communication signals that may be transmitted in other frequency ranges.

The term "assigned frequency range" may refer to one or more frequencies within the electromagnetic spectrum that may be designated for wireless communications. Additionally, an "assigned frequency range" may include or be included in one or more bands or channels that may be frequency ranges allocated for specific types of wireless communications. Additionally, in some instances, a channel may be a sub-range of a frequency range. Further, each channel may also include one or more sub-ranges that may be used for wireless communications. For example, a wireless communication signal may be a signal allocated for transmission in a narrow frequency range, which may be within a channel, which may be within a larger frequency band.

According to some embodiments described herein, a wireless transmitter (referred to hereinafter as a "transmitter") may include a first mixer configured to perform mixing with respect to a baseband signal to produce a shifted signal with a shifted frequency. In some embodiments, the baseband signal may be assigned for transmission within a narrow frequency range of a wireless communication channel that may be used to transmit a wireless communication signal. Additionally, the shifted frequency may be a frequency that is shifted toward a center frequency of the wireless communication channel by a frequency offset.

The transmitter may also include an oscillator circuit configured to generate a modulating signal that may be mixed with the shifted signal to produce a transmission signal. In some embodiments, the oscillator circuit may be configured to shift a modulation frequency of the modulating signal toward the assigned narrow frequency range and away from the center frequency by the frequency offset. The transmitter may also be configured to mix the shifted signal with the modulating signal to produce the transmission signal, which, in some embodiments, may be transmitted as a wireless communication signal.

Due to the frequency shifting, the transmission signal may have a transmission frequency that may be substantially within the assigned narrow frequency range. Additionally, due to the shifting, the modulation frequency may be closer to the assigned narrow frequency range than it otherwise would have been which may reduce the spectral footprint of the transmission signal and its associated artifacts. As mentioned above, the reduced spectral footprint of the transmission signal and its associated artifacts may reduce interference experienced by other wireless communication signals that may be transmitted in other frequency ranges.

In some embodiments, the transmitter may be implemented with respect to one or more components of a wireless communication system to improve the communication of information via the wireless communication system. Embodiments of the present disclosure will be explained with reference to the accompanying drawings.

FIG. 1 illustrates an example wireless communication system 100 (referred to hereinafter as "system 100"), arranged in accordance with at least one embodiment described herein. The system 100 may be configured to provide wireless communication services to one or more terminals 106 via one or more access points 104. Although not expressly illustrated in FIG. 1, the system 100 may include any number of access points 104 providing wireless communication services to any number of terminals 106. Additionally, with respect to the use of substantially any plural and/or singular terms herein, those having skill in the art can translate from the plural to the singular and/or from the singular to the plural as is appropriate to the context and/or application.

The wireless communication services provided by the system 100 may include voice services, data services, messaging services, and/or any suitable combination thereof. The system 100 may include a Time Division Duplexing (TDD) network, a Frequency Division Duplexing (FDD) network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 100 may be configured to operate as a second generation (2G) wireless communication network, a third generation (3G) wireless communication network, a fourth generation (4G) wireless communication network, and/or a Wi-Fi network. In these or other embodiments, the system 100 may be configured to operate as a Long Term Evolution (LTE) wireless communication network.

The access point 104 may be any suitable wireless network communication point that may provide wireless communication services to the terminal 106. The access point 104 may include, by way of example but not limitation, a base station, a remote radio head (RRH), a Node B, an evolved Node B (eNB), or any other suitable communication point. In some embodiments, a mobile switching center (MSC) 110 may be communicatively coupled to the access points 104 and may provide coordination and control for the access points 104.

The terminal 106 may be any device that may use the system 100 for obtaining wireless communication services and may also be referred to as a remote station, a mobile station, an access terminal, user equipment (UE), a wireless communication device, a cellular phone, or some other terminology. For example, a terminal 106 may include, by way of example and not limitation, a cellular phone, a smartphone, a personal data assistant (PDA), a laptop computer, a personal computer, a tablet computer, a wireless communication card, or any other similar device configured to communicate within the system 100.

A terminal 106 may or may not be capable of receiving signals from one or more satellites 108. In some embodiments, the satellites 108 may belong to a satellite positioning system such as the well-known Global Positioning System (GPS). Additionally, a terminal 106 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 106 is shown as receiving signals from multiple transmitting sources simultaneously, where a transmitting source may be an access point 104 or a satellite 108. In certain embodiments, a terminal 106 may also be a transmitting source. In general, a terminal 106 may receive signals from zero, one, or multiple transmitting sources at any given moment. Additionally, for simplicity, only two terminals 106 and two access points 104 are shown in FIG. 1; however, the system 100 may include any number of terminals 106 and access points 104. Each of the terminals 106, access points 104, and satellites 108 is an example of a transmitting and/or receiving element.

FIG. 2 illustrates a block diagram of selected components of an example transmitting and/or receiving element 200 configured to generate a transmission signal, arranged in accordance with at least one embodiment described herein. In the illustrated embodiment, the element 200 may include a transmit path 201, digital circuitry 202, and an oscillator circuit 210. In some embodiments, the element 200 may also include a receive path (not expressly depicted). Accordingly, depending on the functionality of the element 200, the element 200 may be considered a transmitter, a receiver, or a transceiver. In some embodiments, the element 200 may be configured to generate a wireless communication signal according to the LTE standard.

In the LTE standard, a wireless communication signal may be transmitted in a designated frequency band for transmission of the wireless communication signal. In some instances, the designated frequency band may include a channel as a sub-band, which may also include relatively narrow frequency ranges that may be allocated for wireless communication signal transmission. In some embodiments, the wireless communication signal may be assigned a wireless channel that may include one of the allocated narrow frequency ranges (or resource blocks in the LTE standard) such that the wireless communication signal may be assigned to transmit in one of the allocated narrow frequency ranges. Accordingly, the wireless communication signal may be assigned to a relatively narrow frequency range.

In some embodiments, the element 200 may be configured to upconvert a signal to an assigned narrow frequency range by mixing the signal with a modulating signal having a modulation frequency. The closer the modulation frequency may be to the assigned narrow frequency range, the more spectrally compact the overall spectral footprint of the wireless communication signal and its associated artifacts may be.

For example, FIG. 2B illustrates an example of a wireless communication signal 232 and some of its associated artifacts 234-237. In the illustrated embodiment, the wireless communication signal 232 may be assigned to a narrow frequency range that may be centered at a frequency "$f_0$." Additionally, in FIG. 2B, the wireless communication signal 232 may be generated based on a modulating signal 230 having a modulation frequency of "$f_{m1}$." In the illustrated embodiment, the frequency "$f_0$" may be spectrally spaced from the frequency "$f_{m1}$" by a frequency difference of "$2\Delta f$," which may affect the spectral footprint of the artifacts 234-237.

Figure 2A:
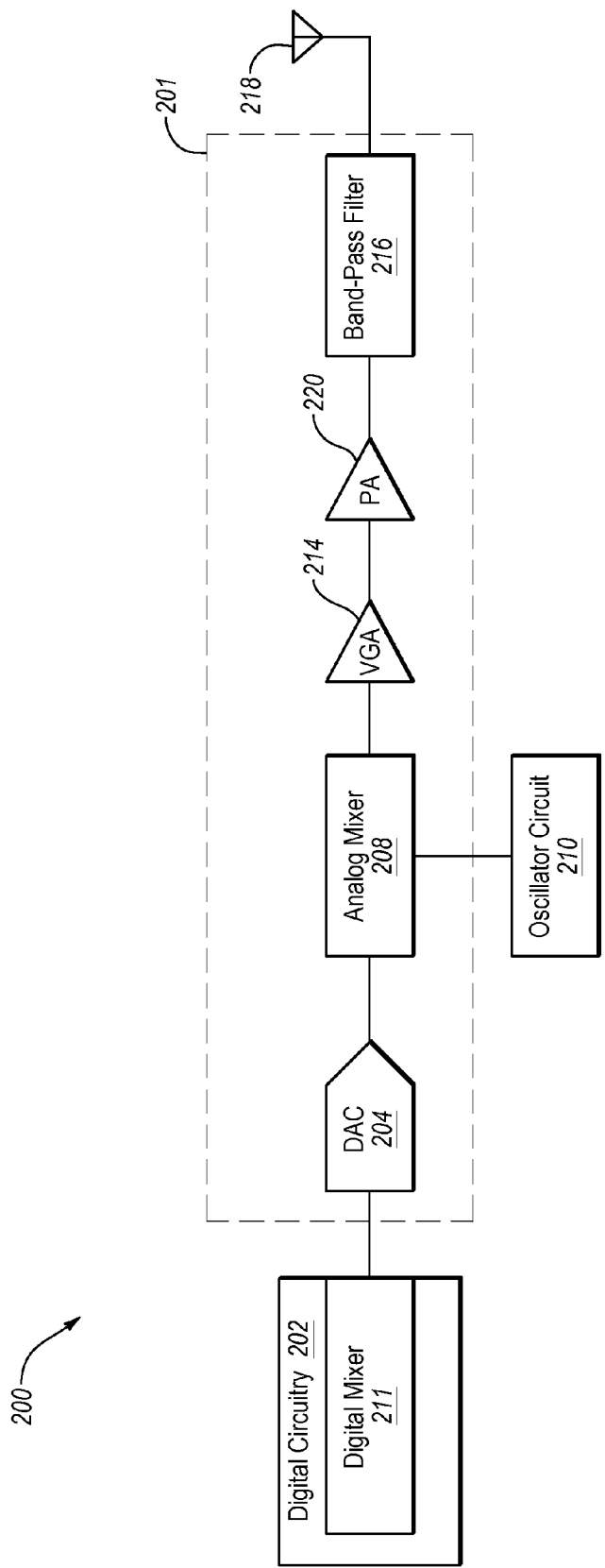
FIG. 2A illustrates a block diagram of selected components of an example transmitting and/or receiving element configured to generate a transmission signal.
Figure 2C:
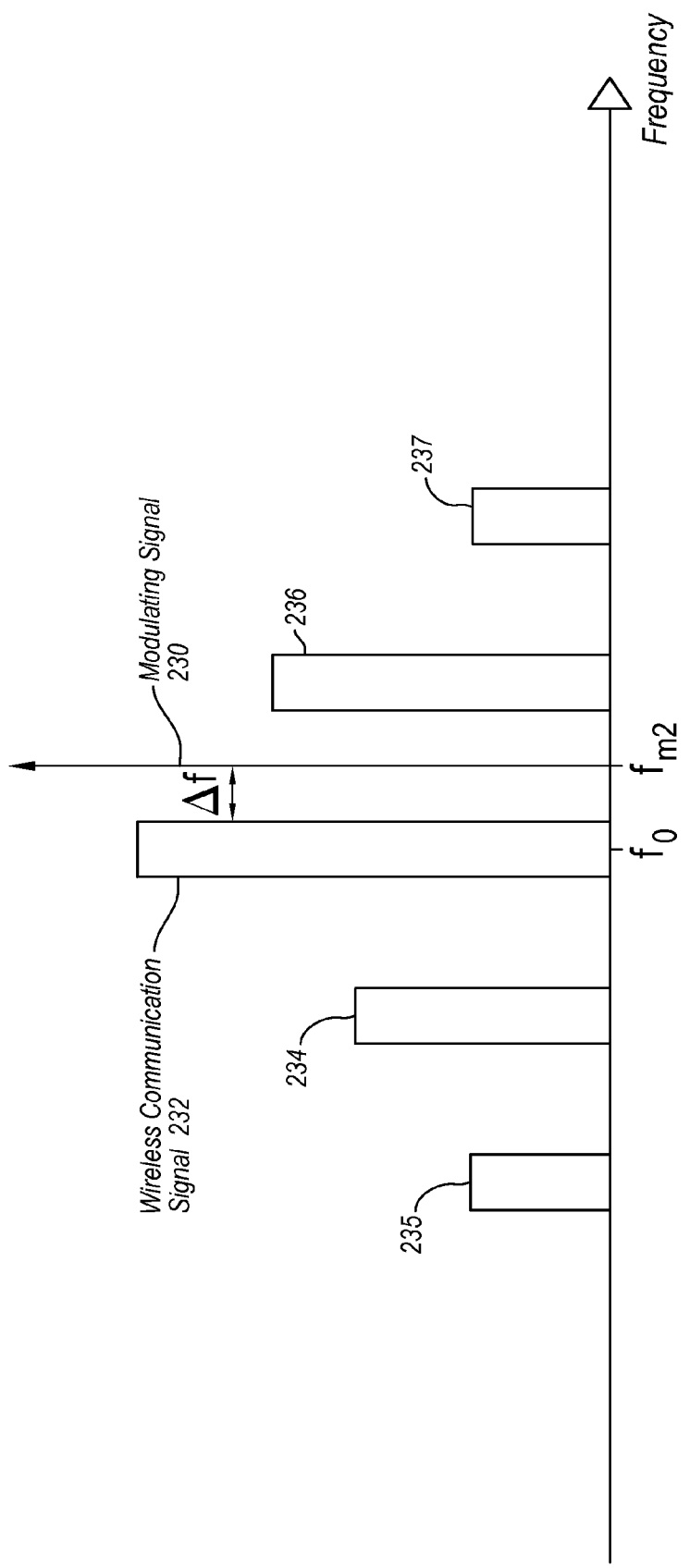
FIG. 2C illustrates another example of a wireless communication signal and its associated artifacts.

FIG. 2C illustrates another example of the wireless communication signal 232 and the artifacts 234-237, when the modulating signal 230 may have a modulation frequency of "$f_{m2}$" instead of "$f_{m1}$," where "$f_{m2}$" may be spectrally spaced from "$f_0$" by "$\Delta f$" instead of "$2\Delta f$." As illustrated by a comparison of FIGS. 2B and 2C, reducing the frequency difference between the assigned narrow frequency range of the wireless communication signal 232 and the modulation frequency of the modulating signal 230 may reduce the spectral spacing of the artifacts 234-237, which may reduce the overall spectral footprint of the wireless communication signal 232 and its associated artifacts (e.g., the artifacts 234-237).

Therefore, as detailed below, the element 200 may be configured such that a frequency difference between an allocated narrow frequency band assigned to a wireless communication signal and the modulation frequency of a modulating signal used to upconvert a signal that may be used for transmission as the wireless communication signal may be reduced. Therefore, the overall spectral footprint of the wireless communication signal and its associated artifacts may be more compact than other similar wireless communication signals generated using other methodologies, which may reduce the amount of interference experienced by other wireless communication signals that may be caused by the wireless communication signal.

The element 200 of FIG. 2A may include digital circuitry 202 that may include any system, device, or apparatus configured to process signals and information for transmission via the transmit path 201. In some embodiments, the digital circuitry 202 may also be configured to process signals and information received via a receive path of the element 200. The digital circuitry 202 may include one or more microprocessors, microcontrollers, digital signal processors (DSP), application-specific integrated circuits (ASIC), a Field Programmable Gate Array (FPGA), or any other digital or analog circuitry configured to interpret and/or to execute program instructions and/or to process data and/or signals. In some embodiments, the program instructions and/or process data may be stored in memory.

The memory may include any suitable computer-readable media configured to retain program instructions and/or data for a period of time. By way of example, and not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other tangible and/or non-transitory storage medium which may be used to carry or store desired program code in the form of computer-executable instructions or data structures and which may be accessed by the processor. Combinations of the above may also be included within the scope of computer-readable media. Computer-executable instructions may include, for example, instructions and data that cause a general purpose computer, special purpose computer, or special purpose processing device (e.g., a processor) to perform a certain function or group of functions.

In some embodiments, the digital circuitry 202 may also include a digital mixer 211. In some embodiments, the digital mixer 211 may be configured to receive a baseband signal from which a wireless communication signal having a frequency within an assigned narrow frequency band may be derived. The digital mixer 211 may be configured to mix the assigned narrow frequency range signal to produce a shifted signal having a shifted frequency. In some embodiments, the digital mixer 211 may include a digital single-sideband (SSB) mixer configured to perform the mixing.

In some embodiments, the shifted frequency may be based on an allocated narrow frequency range of a channel that may be assigned to the wireless communication signal, a center frequency of the channel of which the assigned narrow frequency range may be included, and a frequency offset. For example, in some embodiments, the shifted frequency may be based on a shift from the assigned narrow frequency range toward the center frequency of the channel by the frequency offset. Determination of the frequency offset is explained in further detail below. In some embodiments, the digital mixer 211 may perform the mixing according to the following expression:

$$y(n)=x(n)*e^{j2\pi\Delta f T_s n}$$

In the above expression, "$x(n)$" may represent the baseband signal received by the digital mixer 211, "$T_a$" may represent the sampling period of $x(n)$ (which may be based on the assigned narrow frequency range), "$\Delta f$" may represent the frequency offset, "$n$" may represent a particular sample, "$y(n)$" may represent the output of the digital mixer 211, which may be the shifted signal, and "$j$" may represent the imaginary unit where $j^2=-1$.

In some embodiments, the transmit path 201 may include a digital-to-analog converter (DAC) 204. The DAC 204 may be configured to receive the shifted signal (which may be a digital signal) from the digital mixer 211 and may be configured to convert the received shifted signal into an analog signal. The shifted signal, which may be an analog signal at this point, may then be passed to one or more other components of the transmit path 201, including an analog mixer 208. The analog mixer 208 may be configured to mix the shifted signal with a modulating signal provided by the oscillator circuit 210 to produce a transmission signal that may have a transmission frequency within the assigned narrow frequency range, as explained further below.

In some embodiments, the above-described mixing performed by the digital mixer 211 may be performed alternatively by another analog mixer (other than the analog mixer 208). Accordingly, in such embodiments, the DAC 204 may be configured to receive the baseband signal, which may subsequently be communicated to the other analog mixer. The other analog mixer may accordingly be configured to produce the shifted signal in a manner similar to that described above with respect to the digital mixer 211.

The oscillator circuit 210 may be any suitable device, system, or apparatus configured to produce a waveform of a particular frequency (e.g., the modulating signal) that may be mixed with the shifted signal to produce the transmission signal having an applicable radio frequency within the assigned narrow frequency range. In some embodiments, the oscillator circuit 210 may include an agile frequency source that may adjust a modulation frequency of the modulating signal based on the frequency offset and the center frequency of the channel associated with the assigned narrow frequency range. For example, in some embodiments, the oscillator circuit 210 may be configured to shift the modulation frequency away from the center frequency and toward the assigned narrow frequency range by the frequency offset. In some embodiments, the oscillator circuit 210 may shift the modulation frequency based on a control signal received from the digital circuitry 202.

In some embodiments, the analog mixer 208 may perform the mixing according to the following expression:

$$y(t) = \text{real}(x(t) * e^{j2\pi(f_c - \Delta f)t})$$

In the above expression, "x(t)" may represent the shifted signal, "$f_c$" may represent the center frequency of the channel of which the assigned narrow frequency range may be included, "$\Delta f$" may represent the frequency offset, "t" may represent a particular time, "real" may represent the real numbers associated with "$x(t) * e^{j2\pi(f_c - \Delta f)t}$," "y(t)" may represent the output of the analog mixer 208, which may be the transmission signal, and "j" may represent the imaginary unit.

Shifting the modulation frequency of the modulating signal toward the assigned narrow frequency range by the frequency offset and mixing the modulating signal with the shifted signal to produce the transmission signal may cause the transmission frequency of the transmission signal to shift—with respect to the shifted frequency—toward the assigned narrow frequency range by the amount of the frequency offset. Therefore, the transmission frequency of the transmission signal may be substantially within the assigned narrow frequency range. Additionally, the modulation frequency may be moved closer toward the assigned narrow frequency range by the amount of the frequency offset than if the modulation frequency were based on the center of the channel. Accordingly, the overall spectral footprint of the wireless communication signal and its associated artifacts that may be transmitted by the element 200 (which may be based on the transmission signal) may be reduced, which may reduce interference of other wireless communication signals that may be caused by the wireless communication signal.

In some embodiments, the frequency offset may be determined based on how spectrally close other channels or frequency bands may be to the channel and frequency band of which the assigned narrow frequency range is included. For example, when the frequency band, of which the channel and narrow frequency range may be included, is relatively close in frequency to another frequency band (e.g., a frequency band adjacent to or neighboring the frequency band-of-interest) that may also be used for wireless communications, the frequency offset may be determined such that the shifted frequency and the assigned narrow frequency range are closer to each other than when the allocated frequency band-of-interest is further away from another frequency band.

Accordingly, the amount of offset may be determined based on the likelihood that artifacts of the wireless communication signal may spill into other frequency ranges, which may affect the amount of potential interference the wireless communication signal may cause with respect to other wireless communication signals. Additionally, in some embodiments, the frequency offset may be based on a previously predetermined number of offsets with predetermined magnitudes of offset from the center of the channel depending on potential interference within other frequency bands or channels that may be relatively close in frequency to the channel and/or the frequency band associated with the channel. In some embodiments, the frequency offset may be determined based on an allowed (e.g., maximum allowed) amount of interference that may be caused by the wireless communication signal to a neighboring frequency band of which the channel may be included and/or a neighboring channel of the channel, which may or may not be included in the same frequency band as the wireless communication signal.

In some embodiments, the digital circuitry 202 may include some sort of processing device configured to determine the frequency offset and may indicate such to the digital mixer 211 (or other analog mixer) and the oscillator circuit 210. Alternately or additionally, in some embodiments, the computer-readable media of the digital circuitry 202 may include the predetermined frequency offsets stored thereon.

Figure 2D:
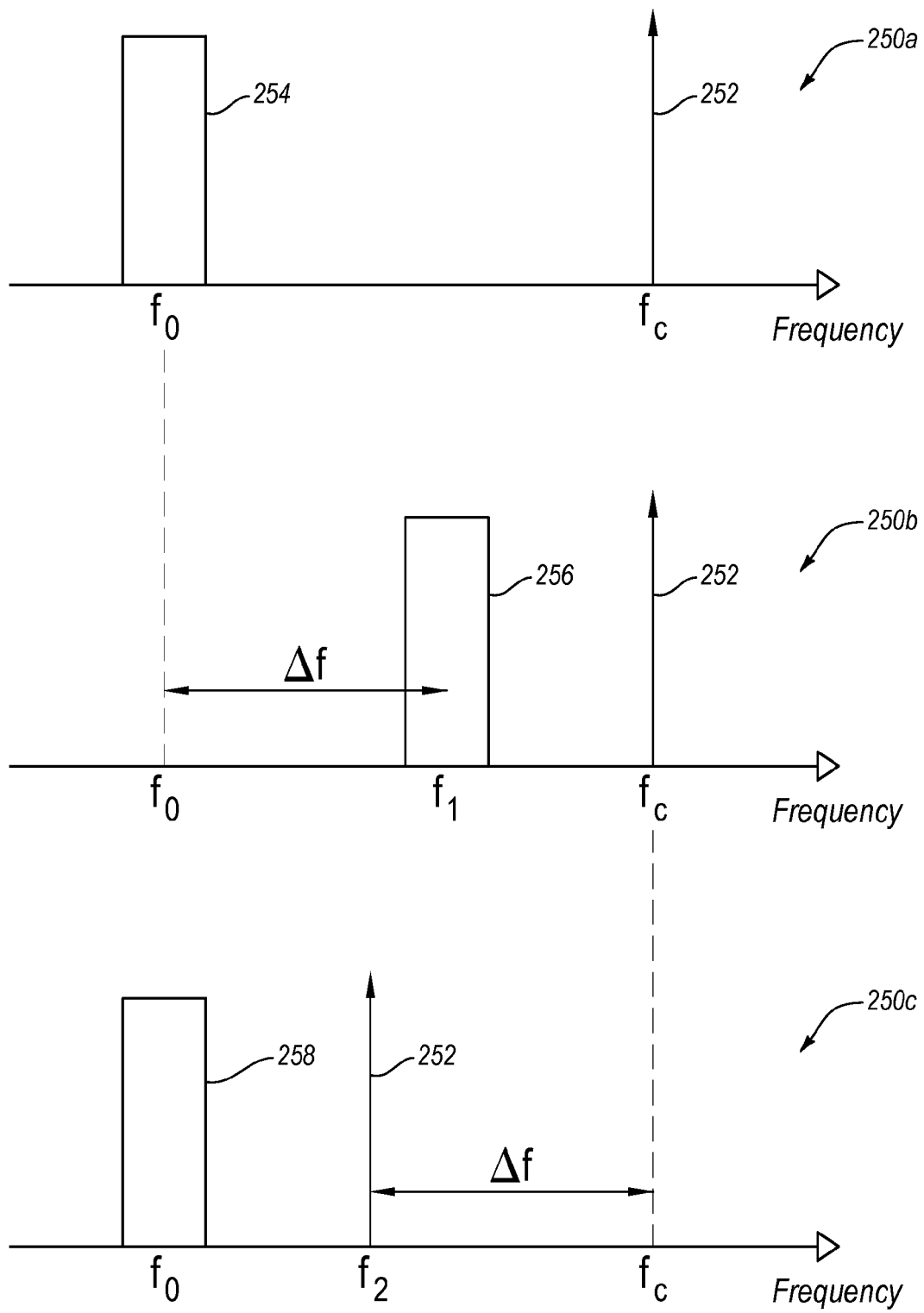
FIG. 2D illustrates an example of the shifting done by a digital mixer and an analog mixer of the element of FIG. 2A.

FIG. 2D illustrates an example of the shifting done by the digital mixer 211 and the analog mixer 208, in accordance with at least one embodiment described herein. Plot 250a illustrates a signal 254 and a modulating signal 252 before any shifting or mixing has occurred. The signal 254 in plot 250a may be assigned to be transmitted as a wireless communication signal in an allocated narrow frequency range that may be centered at a frequency "$f_0$." Additionally, the location of the modulating signal 252 in the plot 250a may indicate the modulation frequency of the modulating signal 252. In the illustrated embodiment of the plot 250a, the modulation frequency may be substantially equal to a center frequency ("$f_c$") of a channel in which the assigned narrow frequency range may be included. Additionally, the signal 254 may not necessarily represent the actual baseband signal that may be received by the digital mixer 211 as described above, but is merely meant to illustrate the desired frequency of the wireless communication signal that may be transmitted by the element 200.

A plot 250b illustrates a shifted signal 256 that may include a frequency shifted from the frequency "$f_0$" based on the mixing performed by digital mixer 211 with respect to the signal 254 of the plot 250a in a manner as described above. In the illustrated embodiment, the shifted signal 256 may be centered at a frequency "$f_1$," which may be shifted away from the frequency "$f_0$" and toward the frequency "$f_c$" by a frequency offset of "$\Delta f$." In the plot 250b, the modulation frequency of the modulating signal 252 may still be at the frequency "$f_c$." The shifted signal 256 may not necessarily represent the actual shifted signal that may be produced by the digital mixer 211, but instead illustrates the effect on the frequency of the signal 254 of applying the frequency offset by the digital mixer 211.

A plot 250c illustrates a transmission signal 258 that may be produced by the analog mixer 208 mixing the shifted signal 256 with the modulating signal 252 when the modulation frequency of the modulating signal 252 may be at a frequency "$f_2$." The modulation frequency may be at the frequency "$f_2$" based on a frequency shift of the modulation frequency away from the frequency "$f_c$" toward the frequency "$f_0$" by approximately the amount of "$\Delta f$." Additionally, as depicted in the plot 250c, shifting the modulation frequency of the modulating signal 252 as described may shift the transmission frequency of the transmission signal 258 such that the transmission frequency may be centered at "$f_0$" of the assigned narrow frequency range, as desired. Further, the modulation frequency of the modulating signal 252 may now be closer to the assigned narrow frequency range than if it had stayed at the frequency "$f_c$" such that the overall spectral footprint of the transmission signal 258 and its associated artifacts may be reduced.

In some embodiments, the transmit path 201 of FIG. 2A may also include a variable-gain amplifier (VGA) 214 configured to amplify the transmission signal for transmission of the transmission signal. In these and other embodiments, the transmit path 201 may include a power amplifier (PA) 220 configured to receive the transmission signal that may be amplified by the VGA 214. The PA 220 may also be configured to amplify the transmission signal. The transmit path may additionally include a band-pass filter 216 configured to receive the transmission signal amplified by the VGA 214 and the PA 220. The band-pass filter 216 may be configured to pass signal components of the transmission signal in the designated frequency range of the transmission signal, and to remove out-of-band noise and undesired signals. The amplified and filtered transmission signal may be received by the antenna 218, which may be configured to transmit the transmission signal as a wireless communication signal.

Accordingly, the element 200 may be configured to transmit a wireless communication signal in a manner such that the overall spectral footprint of the wireless communication signal and its respective artifacts may be reduced as compared to other methods of transmitting wireless communication signals. Additionally, a reduced spectral footprint of the wireless communication signal and its associated artifacts may reduce interference that may be caused by the wireless communication signal.

Modifications, additions, or omissions may be made to the element 200 without departing from the scope of the present disclosure. For example, in some embodiments, the mixing and modulation performed by the analog mixer 208 may be performed via digital mixing and modulation before or at the DAC 204 instead of being performed by the analog mixer 208 such that the element 200 may not include the analog mixer 208. Further, as mentioned above, in some embodiments, the mixing performed by the digital mixer 211 may be performed instead by an analog mixer after the DAC 204. Additionally, the element 200 may include any number of components not expressly described and illustrated. Further, additional components may be communicatively coupled between the components expressly described and illustrated. For example, the element 200 may also include a receive path configured to process wireless communication signals that may be received by the antenna 218 and/or by a different antenna. Additionally, in some embodiments, one or more of the expressly illustrated and described components of the element 200 may be omitted.

Figure 3:
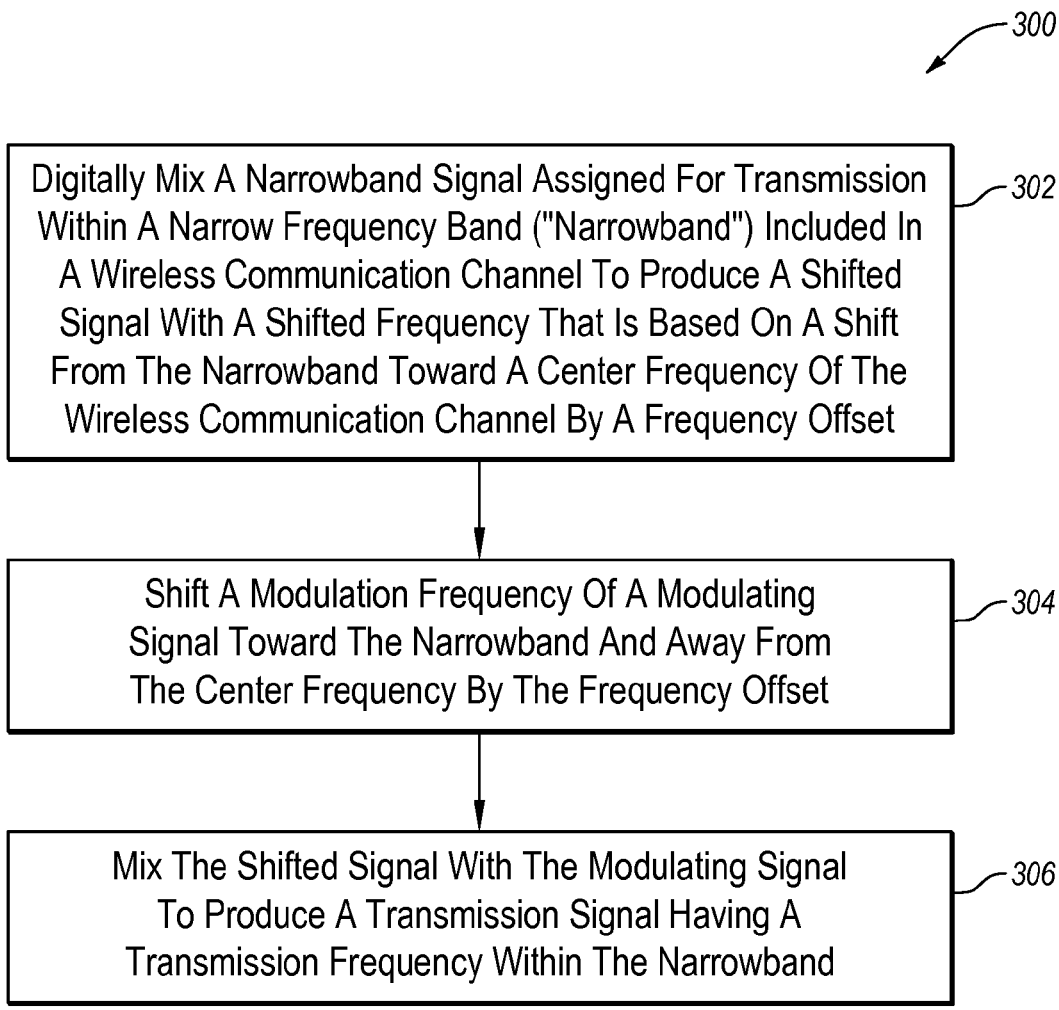
FIG. 3 is a flowchart of an example method of generating a transmission signal.

FIG. 3 is a flowchart of an example method 300 of generating a transmission signal, arranged in accordance with at least one embodiment described herein. The method 300 may be implemented, in some embodiments, by one or more components of a transmitting element, such as an element 200 and its associated components described with respect to FIG. 2A. Although illustrated as discrete blocks, various blocks may be divided into additional blocks, combined into fewer blocks, or eliminated, depending on the desired implementation.

The method 300 may begin at block 302 where a baseband signal assigned for transmission within an allocated narrow frequency range may be mixed to produce a shifted signal. The narrow frequency range may be included in a wireless communication channel and the shifted signal may have a shifted frequency that is based on a shift toward a center frequency of the wireless communication channel by a frequency offset. In some embodiments, the mixing may include performing complex multiplication involving the baseband signal and the frequency offset. Further, in some embodiments, the wireless communication channel may be associated with an LTE wireless communication channel and the narrow frequency range may be assigned based on a number of LTE wireless communication allocated resource blocks for transmission. Additionally, in some embodiments, the frequency offset may be determined based on an allowed amount of interference that may be caused by the transmission signal to a neighboring frequency band of a frequency band of which the channel is included or a neighboring channel of the channel, which may or may not be included in the same frequency band as the wireless communication signal. In some embodiments, the allowed amount of interference may be based on a maximum allowed amount of interference. In some embodiments, the mixing at block 302 may be performed by a digital mixer such as the digital mixer 211 described above. In other embodiments, the mixing at block 302 may be performed by an analog mixer.

At a block 304, a modulation frequency of a modulating signal may be shifted. In some embodiments, the modulation frequency may be shifted toward the assigned narrow frequency range and away from the center frequency by the frequency offset. At a block 306, the shifted signal may be mixed with the modulating signal to produce a transmission signal having a transmission frequency within the narrow frequency range. In some embodiments, the mixing at block 306 may be performed by an analog mixer such as the analog mixer 208 described above. In other embodiments, the mixing at block 306 may be performed digitally.

Accordingly, the method 300 may be performed to produce a transmission signal that may have artifacts with a reduced spectral spacing such that the overall spectral footprint of the transmission signal and its associated artifacts may be reduced as compared to other methods that may be used to produce a transmission signal. One skilled in the art will appreciate that, for this and other processes and methods disclosed herein, the functions performed in the processes and methods may be implemented in differing order. For example, in some embodiments, the method 300 may include operations associated with generating the modulating signal. Additionally, the method 300 may include operations associated with transmitting the transmission signal as a wireless communication signal. Furthermore, the outlined steps and operations are only provided as examples, and some of the steps and operations may be optional, combined into fewer steps and operations, or expanded into additional steps and operations without detracting from the essence of the disclosed embodiments.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. As mentioned above, and by way of example and not limitation, such computer-readable media may include tangible computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a special purpose or general purpose computer. Combinations of the above may also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of generating a transmission signal, the method comprising:
    mixing a baseband signal assigned for transmission within an assigned narrow frequency range of a wireless communication channel to produce a shifted signal with a shifted frequency that is based on the assigned narrow frequency range and a frequency offset associated with a modulating signal;
    shifting a modulation frequency of the modulating signal toward the assigned narrow frequency range and away from a center frequency of the wireless communication channel by the frequency offset; and
    mixing the shifted signal with the modulating signal to produce a transmission signal having a transmission frequency within the assigned narrow frequency range.

2. The method of claim 1, further comprising generating the modulating signal with an agile frequency source.

3. The method of claim 1, wherein the wireless communication channel is associated with a Long Term Evolution (LTE) wireless communication channel.

4. The method of claim 1, further comprising performing the mixing of the baseband signal based on a frequency associated with the assigned narrow frequency range.

5. The method of claim 1, further comprising transmitting the transmission signal as a wireless communication signal.

6. The method of claim 1, wherein mixing the baseband signal comprises performing complex multiplication involving the baseband signal and the frequency offset to produce the shifted signal.

7. The method of claim 1, further comprising determining the frequency offset based on an allowed amount of interference caused by the transmission signal to one or more of a neighboring frequency band of a frequency band of which the channel is included and a neighboring channel of the channel.

8. The method of claim 1, wherein the assigned narrow frequency range is assigned based on a Long Term Evolution (LTE) wireless communication resource block.

9. The method of claim 1, further comprising using a digital single-sideband mixer to digitally mix the assigned narrow frequency range signal.

10. The method of claim 1, further comprising performing analog mixing to mix the shifted signal with the modulating signal to produce the transmission signal.

11. The method of claim 1, further comprising performing digital mixing to mix the shifted signal with the modulating signal to produce the transmission signal.

12. A system of generating a transmission signal, the system comprising:
    a first mixer configured to mix a baseband signal assigned for transmission within an assigned narrow frequency range of a wireless communication channel to produce a shifted signal with a shifted frequency that is based on the assigned narrow frequency range and a frequency offset associated with a modulating signal;
    a frequency source configured to generate the modulating signal with a modulation frequency shifted toward the assigned narrow frequency range and away from a center frequency of the wireless communication channel by the frequency offset; and
    a second mixer configured to mix the shifted signal with the modulating signal to produce a transmission signal having a transmission frequency within the assigned narrow frequency range.

13. The system of claim 12, wherein the wireless communication channel is associated with a Long Term Evolution (LTE) wireless communication channel.

14. The system of claim 12, wherein the first mixer is configured to perform the mixing of the baseband signal based on a frequency associated with the assigned narrow frequency range.

15. The system of claim 12, further comprising an antenna configured to transmit the transmission signal as a wireless communication signal.

16. The system of claim 12, wherein the first mixer is configured to digitally mix the baseband signal by performing complex multiplication involving the baseband signal and the frequency offset to produce the shifted signal.

17. The system of claim 12, further comprising a processing device configured to determine the frequency offset based on an allowed amount of interference caused by the transmission signal to one or more of a neighboring frequency band of a frequency band of which the channel is included and a neighboring channel of the channel.

18. The system of claim 12, wherein the assigned narrow frequency range is assigned based on a Long Term Evolution (LTE) wireless communication resource block.

19. The system of claim 12, wherein the second mixer includes an analog mixer.

20. The system of claim 12, wherein the second mixer includes a digital mixer.

* * * * *